E. GEIGER.
WHEEL.
APPLICATION FILED AUG. 18, 1909.

990,251.

Patented Apr. 25, 1911.

3 SHEETS—SHEET 1.

E. GEIGER.
WHEEL.
APPLICATION FILED AUG. 18, 1909.

990,251.

Patented Apr. 25, 1911.
3 SHEETS—SHEET 2.

Witnesses:
HC Hunsberger
F. Stern

Inventor:
Eugen Geiger
by P. Singer Atty.

E. GEIGER.
WHEEL.
APPLICATION FILED AUG. 18, 1909.

990,251.

Patented Apr. 25, 1911.

3 SHEETS—SHEET 3.

Witnesses:

Inventor:
Eugen Geiger

UNITED STATES PATENT OFFICE.

EUGEN GEIGER, OF KARLSRUHE, GERMANY.

WHEEL.

990,251.

Specification of Letters Patent. Patented Apr. 25, 1911.

Application filed August 18, 1909. Serial No. 513,518.

*To all whom it may concern:*

Be it known that I, EUGEN GEIGER, engineer, a subject of the German Emperor, residing at Karlsruhe, in the Grand Duchy of Baden and Empire of Germany, have invented certain new and useful Improvements in Wheels Provided with Sieve-Like Scoops and Adapted for the Mechanical Filtration of Sewage-Water, of which the following is a specification.

The object of this invention is an apparatus adapted for the mechanical filtration of sewage water.

This apparatus consists of a wheel built into the sewage canal, rotatable upon a horizontal shaft, placed at right angles to the canal, and provided with sieve-like scoops, which separate the refuse from the water, running below the shaft in an opposite direction to the rotation of the wheel, and which gradually move this refuse toward a device in the interior of the wheel which discharges it therefrom. The wheel is further provided with a device which shortly after the scoops have discharged the refuse removes the mud clinging to the scoops and brings this also to the above-mentioned discharging device.

In the accompanying drawing is illustrated a constructional form of the object of this invention.

Figure 1:
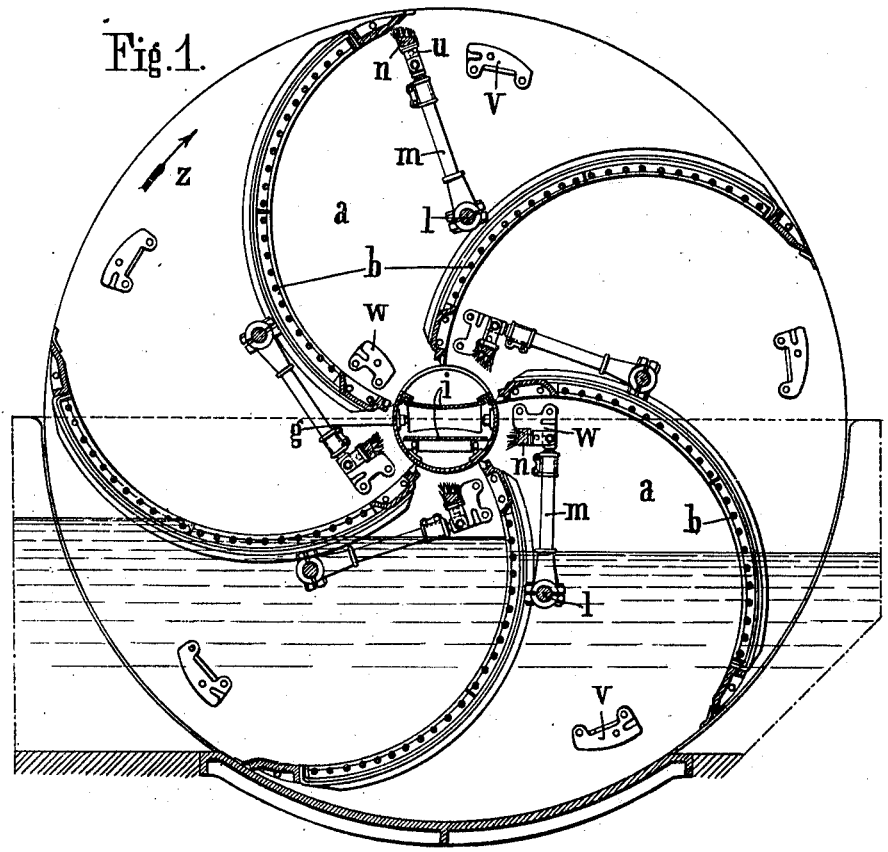
Figure 4:
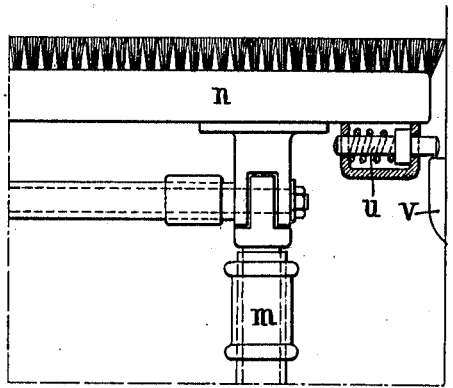
Figure 2:
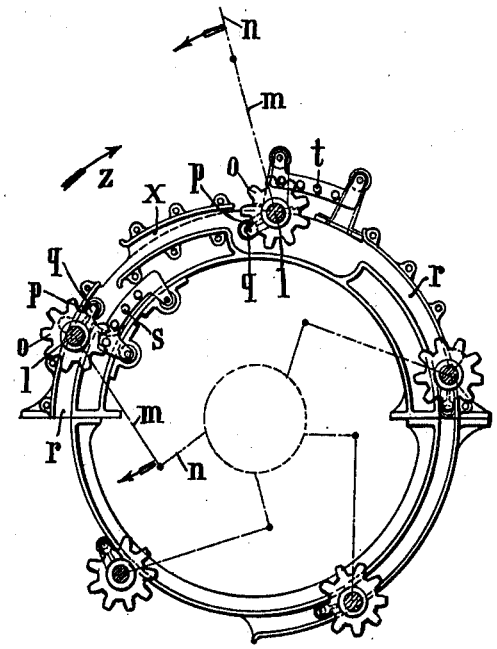
Figure 6:
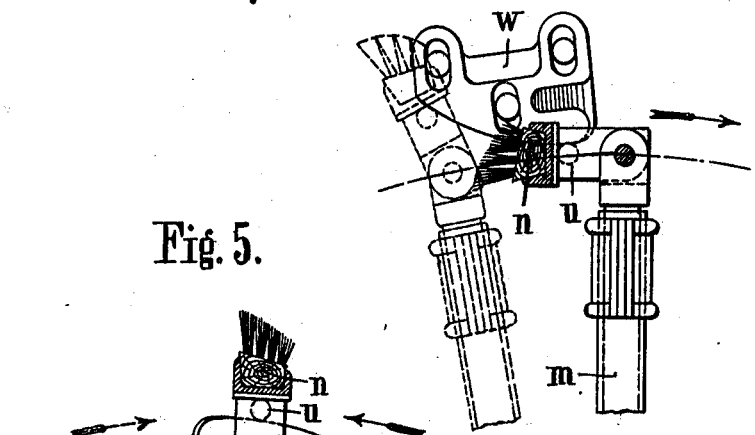
Figure 5:
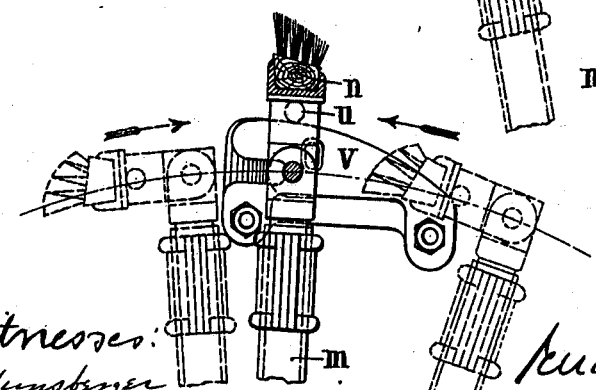
Figure 3:
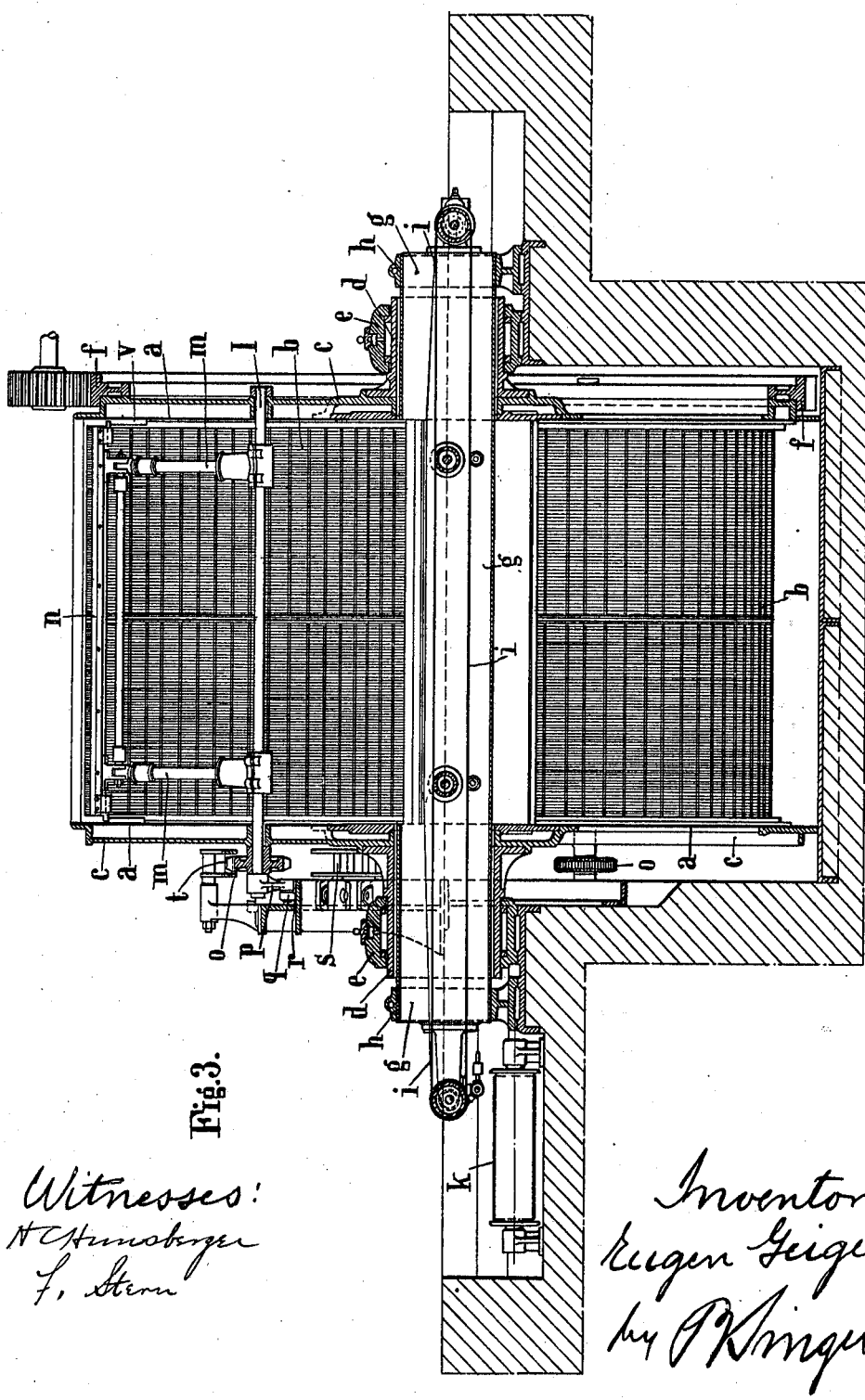

Figure 1 is a cross section of the wheel provided with sieve-like scoops. Fig. 2 is a side elevation of the driving mechanism of the purifying device. Fig. 3 is a longitudinal section of the wheel, and Figs. 4, 5 and 6 show a part of the filtering device on a larger scale in front elevation and also in side elevation in various positions.

The wheel consists of two plane side walls $a$ and five curved, sieve-like scoops $b$ arranged between them. The sheet metal walls $a$ are strengthened by transverse cast-iron arms $c$ to which are secured hollow pivots $d$. The latter rotate in bearings $e$ which are rigidly mounted on the sides of the sewage canal. Around the periphery of the cross arms $c$ (Fig. 3) is further provided a toothed flange $f$; with this gears a small pinion (not shown) which is mounted upon the shaft of an electric motor or other power engine or upon any other driven shaft.

In the interior of the wheel is provided a stationary tin gutter $g$; the part of this gutter between the side walls $a$ is open on the upper side, while portions surrounding the ends of the gutter projecting through the pivots $d$, and fixed in supports $h$, are entirely closed except at the ends. In the gutter $g$ is provided an endless delivery band $i$ and on one side of the wheel (left-hand side of Fig. 3) below the part of the band $i$ projecting from the gutter is provided a second delivery band $k$ arranged at right angles thereto. Both bands run over rollers of which those outside the gutter $g$ are connected by wheel gearing or belt drive to the driving gear of the wheel.

The wheel is rotated in the direction of the arrow $z$ (Figs. 1 and 2), and the scoops thus successively dipping into and being raised out of the water, catch the refuse floating in the latter and allow it to gradually slide on to the band $i$; it is then guided out of the wheel by the band $i$ on to the band $k$ by means of which it is discharged to one side.

At the centers of the curves, which form the scoops $b$, and in the transverse arms $c$, are mounted shafts $l$ which lie parallel to the axis of the wheel. On these shafts, within the side walls $a$, are mounted arms $m$, each consisting of two links, to which are fixed brushes $n$, and beyond one of the side walls (left-hand side of Fig. 3) are mounted on each shaft $l$ a toothed wheel $o$ (Figs. 2 and 3) and a short arm $p$ provided with a roller $q$. On the same side, is fixed to the wall of the sewage canal an interrupted circular path $r$ which lies at the side of and concentric with the wheel. This path is provided with two toothed racks, an upper one $s$ and a lower one $t$; these toothed racks form curves which are concentric with the wheel shaft and lie in the plane of the toothed wheels $o$.

On the rotation of the wheel the rollers $q$ run in the path $r$; by this means the arms $m$ with the brushes $n$ are at first held in their innermost position. At the moment, however, when one of the scoops $b$ rises out of the water the toothed wheel $o$ of the corresponding cleaning devices $m$, $n$ gears with the lower rack $s$; by this means the cleaning device is moved outward when the brush is in the folded position (Fig. 6). As soon as the brush $n$ reaches the outer end of the scoop the toothed wheel $o$ runs off the lower toothed rack $s$ and gears with the upper toothed rack $t$; by this means the cleaning device is again moved inward but the brush is in the extended position (see Figs. 4 and 5).

For the purpose of folding and extending the brushes *n* there are provided at both ends thereof spring-operated pins *u* (Figs. 3–6) and to each of the side walls *a* are fixed outer and inner cam plates *v* and *w* (Figs. 1, 5 and 6). Guiding paths are formed in the latter by which, when the cleaning device is moving in one direction, the pins are guided so that they pass the cam surfaces without altering the position of the brushes, while when traveling in the reverse direction they move over the cam surfaces and thus fold or extend the brushes. The latter are held in both positions by a small locking device which prevents any unintentional alteration in the position thereof.

At the commencement of the inward movement the pins *u* of the folded brush run on the outer cam surface *v* by which they are extended (see Fig. 5) and during the inward movement brush the sieve *b*. Toward the end of the inward movement the extended brush runs over the inner cam piece *w*, when the pins *u* are forced backward by the inclined paths in these pieces so that after passing the pieces they move rapidly forward. The brush then travels such a distance forward that all the refuse is thrown on to the center of the delivery band. The outer guiding surface *x*, of the path *r*, between the toothed racks *s* and *t* is provided in such a manner that the cleaning devices *m*, *n* on the termination of the inward movement travel a short distance outward before reaching their position of rest so that the pins *u* of the brush *n* abut against the rear of the cam piece *w* (see dotted line Fig. 6); the brush thus receives a slight jolt and the material hanging thereon is thrown off. The brush retains this partly folded position in the position of rest of the cleaning device during the whole rotation of the wheel until the corresponding sieve-like scoop *b* again rises out of the water; the cleaning device is then moved outward by the toothed wheel *o* gearing with the rack *s* when the pins *u* will slide over the rear of the cam pieces *w* and the brushes *n* will be folded entirely forward (see Fig. 6). The curved path *r* is embedded between the two racks *s* and *t* to permit of the free rotation of the arms *p* provided with the rollers *q* and the toothed wheels *o* when the latter pass the toothed racks.

What I claim and desire to secure by Letters Patent is:—

1. A sewage separator comprising in combination, with a sewage channel, of a rotary separating device disposed in said channel and provided with curved screen scoops arranged to discharge centrally with respect to the axis of rotation of said separator, arms pivoted at the radial centers of said scoops, spring controlled brushes pivoted on said arms for sweeping the faces of the scoops to discharge the material centrally, cams for folding the brushes inwardly on the inner stroke of said arms, means for moving the arms and brushes outwardly in a folded position and then inwardly to sweep the scoops, and cams for folding the brushes outwardly at their outer stroke.

2. A sewage separator comprising in combination, with a sewage channel, of a rotary separating device disposed in said channel and provided with curved screen scoops arranged to deliver toward the axis of rotation of said separator, arms pivoted at the radial centers of said scoops, brushes pivoted on said arms, the pivots of each arm having a gear and also a lever provided with a roller, guides acting through said rollers for holding the arms and brushes near the center of rotation of said separator during passage of the scoops through the water, a rack for operating gears to move an arm outwardly when its scoop raises out of the water, and a rack engaging such gear for quickly moving the arm inwardly to sweep the contents of the scoop toward the axis of rotation of said separator, substantially as and for the purpose set forth.

3. A sewage separator comprising in combination, with a sewage channel, of a rotary separating device disposed in said channel and provided with curved screen scoops, arms pivoted at the radial center of said scoops, brushes pivoted on said arms, mechanism for moving the arms outwardly and then inwardly, said brushes being provided with pins, cams near the center of said separator having radial cam faces for engagement by said pins to fold the brushes inwardly when the arms are at their inmost position, and cams having outwardly disposed cam faces for engagement by said pins to unfold the brushes when the arms are in their outermost positions.

4. A sewage separator comprising in combination, with a sewage channel, of a rotary separating device disposed in said channel and provided with curved screen scoops, arms pivoted at the radial center of said scoops and provided with folded brush structures, mechanism for moving the arms outwardly and then inwardly, means automatically folding the brush structures into an inoperative position on inward movement of the arms and means automatically unfolding brush structures into an operative position upon outward movement of said arms.

5. A sewage separator comprising in combination, with a sewage channel, of a rotary separating device disposed in said channel and provided with curved screen scoops arranged to discharge centrally with respect to the axis of rotation of said device, centrally disposed traveling means for receiving the sewage discharged from said scoops, arms pivoted at the radial centers of said scoops and provided with folding brush structures, mechanism for moving the arms outwardly and then inwardly, means automatically folding the brush structures into an inoperative position on inward movement of the arms and means automatically unfolding said brush structures into an operative position on outward movement of said arms.

In testimony whereof I have affixed my signature in presence of two witnesses.

EUGEN GEIGER.

Witnesses:
August Ohnimus,
Friedrich Ohnimus.

Copies of this patent may be obtained for five cents each, by addressing the "Commissioner of Patents, Washington, D. C."